United States Patent
Strobel et al.

(10) Patent No.: US 10,944,494 B2
(45) Date of Patent: Mar. 9, 2021

(54) TIMING ALIGNMENT IN DISTRIBUTION POINT UNITS (DPUS) CONNECTED TO A VIRTUAL DISTRIBUTION POINT

(71) Applicant: Intel Corporation, Santa Clara, CA (US)

(72) Inventors: Rainer Strobel, Munich (DE); Vladimir Oksman, Morganville, NJ (US)

(*) Notice: Subject to any disclaimer, the term of this patent is extended or adjusted under 35 U.S.C. 154(b) by 36 days.

(21) Appl. No.: 16/379,991

(22) Filed: Apr. 10, 2019

(65) Prior Publication Data
US 2019/0319728 A1 Oct. 17, 2019

Related U.S. Application Data

(60) Provisional application No. 62/658,302, filed on Apr. 16, 2018.

(51) Int. Cl.
*H04J 3/06* (2006.01)
*H04B 3/32* (2006.01)
*H04J 3/10* (2006.01)

(52) U.S. Cl.
CPC .............. *H04J 3/0658* (2013.01); *H04B 3/32* (2013.01); *H04J 3/0682* (2013.01); *H04J 3/10* (2013.01)

(58) Field of Classification Search
CPC .......... H04J 3/0658; H04J 3/0682; H04J 3/10; H04B 3/32; H04B 3/487
See application file for complete search history.

(56) References Cited

U.S. PATENT DOCUMENTS

| 8,867,404 B2 | 10/2014 | Hung et al. |
| 2014/0056312 A1* | 2/2014 | Strobel ............ H04J 3/10 370/459 |
| 2019/0199583 A1* | 6/2019 | Ginis ............ H04B 3/32 |

FOREIGN PATENT DOCUMENTS

EP 2852067 A1 3/2015

OTHER PUBLICATIONS

European Search Report dated Jul. 25, 2019 in connection with European Patent Application 19169131.0.

* cited by examiner

*Primary Examiner* — Vinncelas Louis
(74) *Attorney, Agent, or Firm* — Maschoff Brennan

(57) ABSTRACT

A system for canceling crosstalk between one or more local distribution point units (DPUs)/fiber extender (FE) and a central distribution point (CDP) in a central office (CO)/cloud. The system can include a processor with memory configured to virtualize signal processing tasks from the DPU/FE, and to the CDP. The virtualization can include moving or splitting signal processing tasks such as a cross talk cancellation operation, from the DPUs/FEs and to the CDP, as virtualization of the tasks, and performing crosstalk cancelation for lines therebetween or with CPEs of a same vectored group.

20 Claims, 11 Drawing Sheets

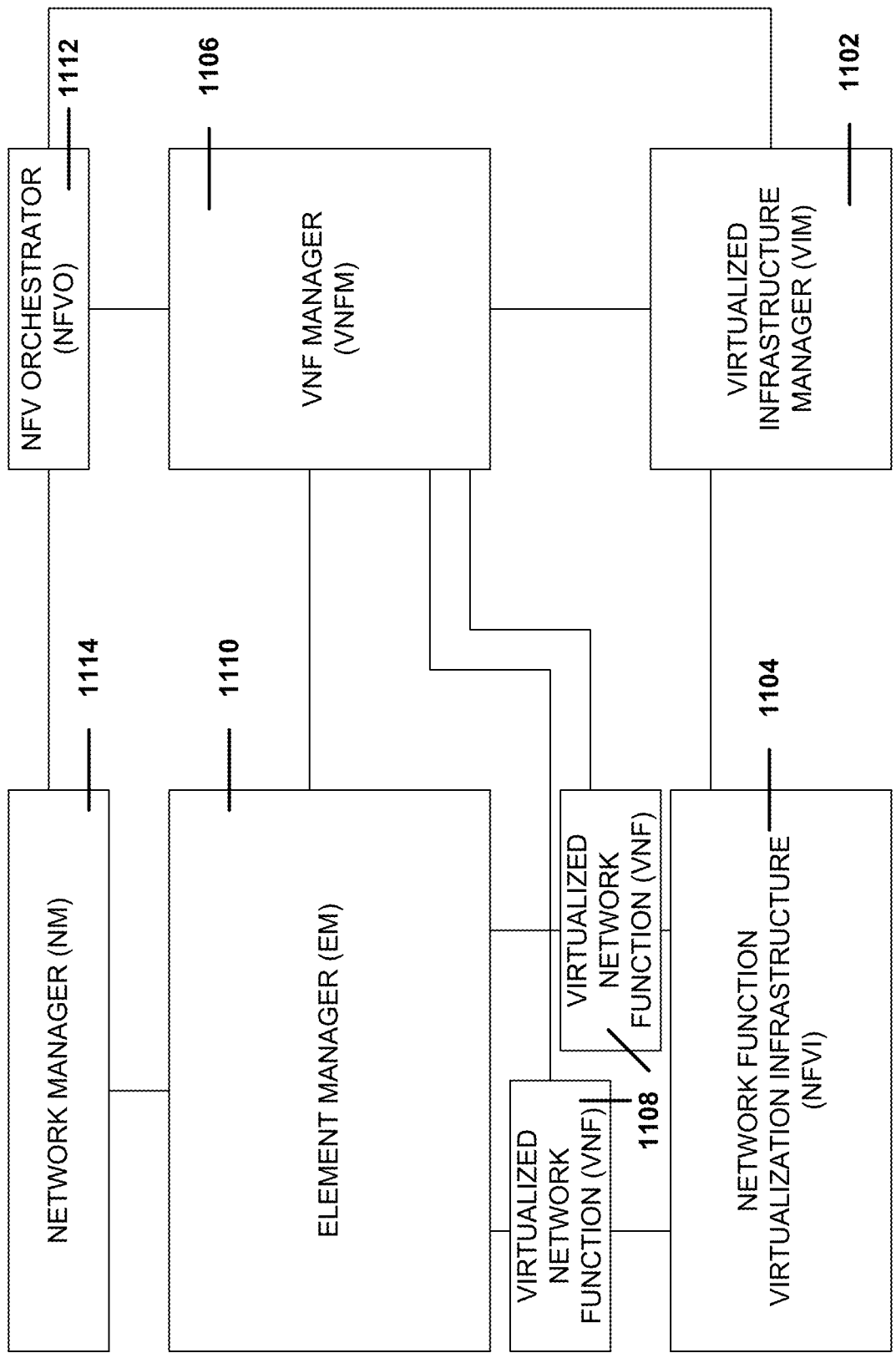

TIMING ALIGNMENT IN DISTRIBUTION POINT UNITS (DPUS) CONNECTED TO A VIRTUAL DISTRIBUTION POINT

REFERENCE TO RELATED APPLICATIONS

This application claims the benefit of U.S. Provisional Application No. 62/658,302 filed Apr. 16, 2018, entitled "TIMING ALIGNMENT IN DISTRIBUTION POINT UNITS (DPUs) CONNECTED TO VIRTUAL DISTRIBUTION POINT", the contents of which are all herein incorporated by reference in their entirety.

FIELD

The present disclosure relates to a timing alignment in distribution point units (DPUs), and more particularly, timing alignment in DPUs connected to a virtual distribution point.

BACKGROUND

To achieve higher data rates in the copper access network, it is required to bring the fiber closer to the subscriber. For multi-Gigabit connections over copper wire, the maximum copper distance is in the range of 30-50 m, and thus, it may be necessary to use multiple distribution point units sourced from a central distribution point (e.g., central office or a big street cabinet) to serve the subscribers in multiple buildings or within the same building. Instead of distribution point units (DPUs), which serve multiple subscribers, fiber extenders (FEs) may be used, where each FE serves a single subscriber.

In case there is crosstalk between the copper wires connecting CPEs to different DPUs or FEs, crosstalk cancellation inside the DPU or FE is not possible, because the transmit and receive signals of the lines connected to other DPUs/FEs are unknown, but at the central place, the central distribution point (CDP), crosstalk cancellation is possible.

Another aspect of modern deployments with multiple DPUs sourced from a CDP is reduction of deployment cost, which is due to a very big amount of small DPUs that are necessary to cover a given customer base. Virtualization of some signal processing tasks of the DPU/FE at the CDP or in the cloud can help to make the DPU devices smaller, simpler, and more power efficient, and allows to do certain tasks (e.g., crosstalk cancellation) across multiple DPUs/FEs.

An issue in performing mutual crosstalk cancelation between lines forming a vectored group is timing alignment between signals transmitted over these lines, in both upstream and downstream direction of transmission.

BRIEF DESCRIPTION OF THE DRAWINGS

FIG. 11 is an exemplary system configured to support Network Functions Virtualization (NFV) for one or more virtualization functions of the DPU, FE or other component herein for timing alignment in DPUs/FEs connected in a virtual distribution point.

DETAILED DESCRIPTION

Figure 1:
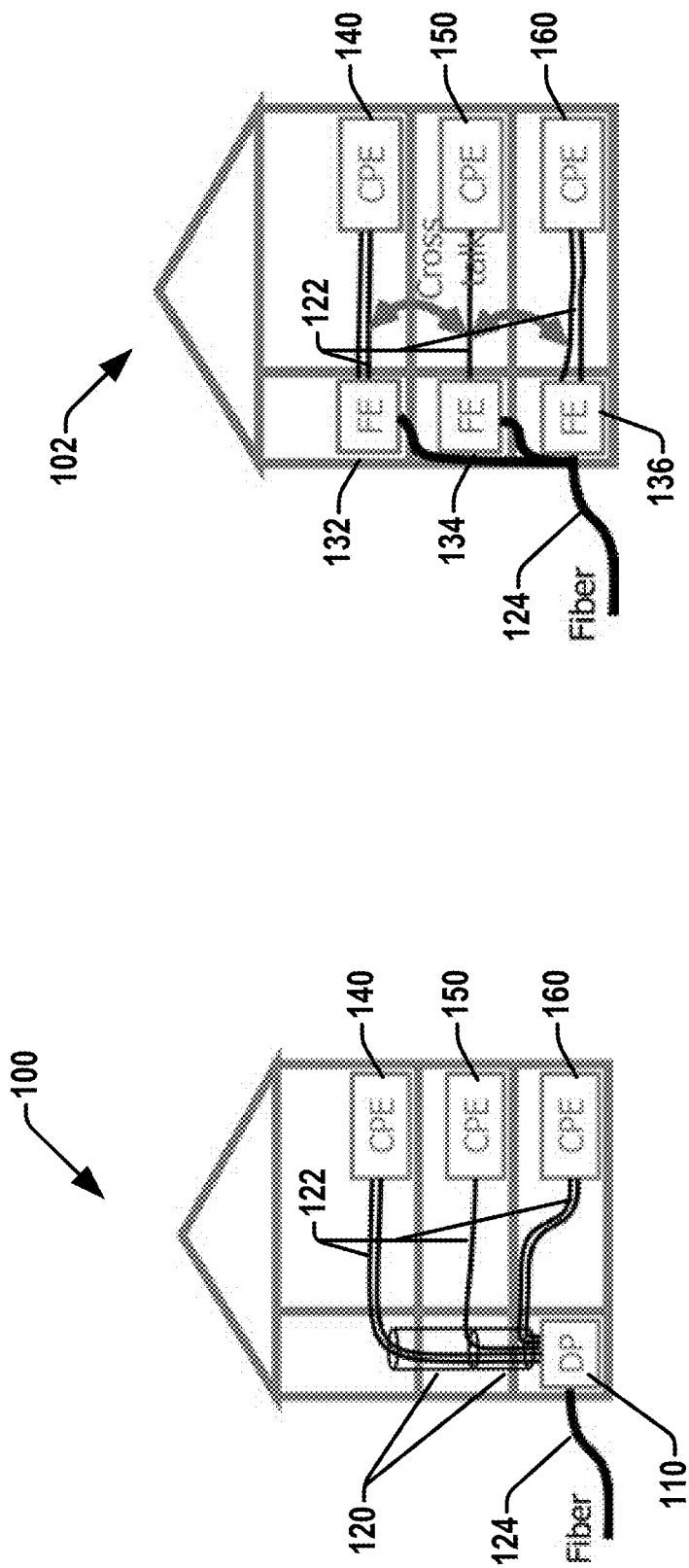
FIG. 1 is a block diagram illustrating fiber to distribution point architecture with distribution point unit (DPU) and fiber extender (FE) architecture with FE of a premises according to various aspects (embodiments) described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (UE) (e.g., mobile/wireless phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In consideration of described deficiencies of access systems a system can provide timing synchronization and mutual crosstalk cancelation between lines forming a vectored group is timing alignment between signals transmitted over the lines in the vectored group, in both upstream and downstream. The problem of mutual crosstalk and timing synchronization can be substantial in case of a virtual CDP or virtualization of various signal processing task, in which lines of the vectored group can be connected to multiple non-co-located DPUs/FEs, all sourced from a virtual CDP, implemented at or as the central office (CO), that virtualizes various signal processing tasks by itself or in a network cloud component (e.g., a processor or processing component of the cloud network). The CDP as discussed herein can be located at a CO, a cabinet component, or other place, for example, and be configured to perform virtualization of one or more signal processing tasks from DPUs (or FEs, as 206, 208 of FIG. 2). The virtualization can be performed by the processing engines of the CDP itself, or by using a cloud, by performing/moving one or more signal processing tasks from DPU(s)/FE(s) to the CO or to the cabinet, or performed in the cloud, all facilitated by the CDP. This virtualization, besides other processing tasks, is intended to perform all or a substantial part of signal processing, such as coding/decoding, modulation/demodulation, duplexing, near-end crosstalk mutual reduction/cancellation cancelation, far-end crosstalk crosstalk mutual reduction/cancellation, etc. Some of these tasks also require timing alignment, e.g., timing alignment between the TX and RX symbols associated with one or more DPUs/FEs and CPEs.

In an aspect, a system can provide network access among a plurality of customer premises equipments (CPEs) that comprises a first CPE of the plurality of CPEs and a second CPE of the plurality of CPEs. The first CPE can comprise one or more first ports coupled to a first set of lines in a vectored group, and the second CPE can comprise one or more second ports coupled to a second set of lines in the vectored group. A plurality of distribution point units (DPUs)/Fiber Extenders (FEs) that are non-colocated with respect to one another can comprise mutual crosstalk with respect to one another, each being as part of the vectored group. The plurality of DPUs/FEs can be coupled to a CDP (e.g., a CO/network cloud component) via one or more fiber links, the first CPE via the first set of lines and the second CPE via the second set of lines (e.g., twisted pairs or copper lines). The CDP (CO/network cloud component) can perform a timing synchronization between the plurality of DPUs/FEs to reduce the mutual crosstalk within the associated vectored group(s). Additional aspects and details are further described below with reference to figures.

Referring to FIG. 1, illustrated are examples of vectored transmission systems 100 and 102 that in part, or whole, can be utilized in accordance with various embodiments herein to provide network access communication to a premises. Exemplary embodiments/aspects herein can be described with respect to as a G.fast or Multi-Gigabit Fast (G.mgfast or MGFAST), or systems based on G.fast, such as FAST-BACK. It is to be noted however that the vectored transmission system is only an exemplary of vectored transmission systems and that vectored transmission systems 100 and 102 can be of any other type or hybrid of each with one or more components of one system 100/102 having one or more components of the other system 102/100 integrated thereof.

System 100 differs from system 102 where a fiber 124 enters the premises at a DPU 110 or at one or more FEs as a point of entry to the customer premise equipments (CPEs) 140, 150, 160. In other words, the system 100 comprises a distribution point unit (DPU) 110, while system 102 comprises multiple fiber extenders (FEs) 132 thru 136. Although any one system 100, 102 or otherwise illustrated herein can have a distribution point(s)/FEs for distribution of lines 122 to different CPEs. Each distribution point unit 110 or FE 132, 134, or 136 can comprise communication circuitry, processing components, memory or other circuitry including transmitter(s), receiver(s), transceivers, interfaces, interface ports/terminals or the like for enabling network distribution of a premise (e.g., 100 or 102) or one or more aspects of embodiments herein. The DPU 110 or FEs 132, 134, 136 can also include one or more processors, represent one or more processors, controllers or microcontrollers of a network device or circuitry, or other component.

At system 100, access lines 120 extend from the DPU 110 to one or more CPEs 140, 150, or 160 (e.g., a home gateway, router, user equipment, internet of things (IoT) device, or the like). The lines 120 are bound together by a binder 120 in a group, and separately connected to the CPEs 140, 150, or 160, which are not necessarily limited to any specific number herein. The DPU 110 feeds a number of CPEs through a binder 120 with lines that can be a twisted wire pair, copper lines, or the like. This might be also buildings in which both DPUs and FEs are present, forming a system model shown in FIG. 5.

Far-end crosstalk (FEXT) between the lines sourced from the DPU 110 can be cancelled by signal processing at the DPU 110 (e.g., by a pre-coder component/post-coder component (not shown)). A main characteristic function of the vector transmission system 100 is to utilize crosstalk cancellation (vectoring) between lines 122 (twisted pairs) of the access lines binder 120, sourced from the DPU 110. Various aspects or embodiments described herein support full duplex (FDX) operation, in which local echo can be cancelled in the DPU 110 and in each CPE 140, 150, 160, and Near-End Crosstalk (NEXT) is cancelled in the DPU 110 and mitigated in the CPEs 140-160 at the customer premises. NEXT, as referred to herein, can occur when a strong signal transmitted over one line (one twisted pair of wires) is picked up by an adjacent line (twisted pair of wires), resulting in a portion of a transmitted signal being electromagnetically coupled back into the received signal.

As stated above, some of the main issues in performing mutual crosstalk cancelation between lines forming a vectored group can be timing alignment between signals transmitted over these lines, in both upstream and downstream. This problem can be very substantial in case of utilization of a virtualization at CDP, in which lines of the vectored group can be connected to multiple non-co-located DPUs/FEs, all sourced from a CDP implemented at the central office (CO) or in the cabinet, that employs virtualization of DPU/FE processing performed locally or in a network cloud.

In wireline, signal processing functionality is not virtualized today. All signal processing tasks are done locally at the DPU, either inside the digital front-end or by central processors across multiple digital front-ends. In this case timing alignment between signals transmitted over different lines of a vectored group is not an issue.

The case in which several non-co-located DPUs or FEs are connected to the lines of the same vectored group is usually just avoided in the architecture since no practical way of time synchronization is available and no mutual data exchanges for vectoring purposes are possible. As such, legacy wireline system avoid deployments in which there is crosstalk between lines connected to different DPUs, because this crosstalk is not possible to cancel due to no common vectoring engine and no timing alignment. However, the modern network architectures require to address G.fast or MGFAST deployment scenarios with mutual crosstalk between DPUs/FEs because of short distances of service and very high density of DPU deployment. Legacy systems perform all processing inside the DPU, which has two issues: —DPUs are complex and consume high power—the deployment becomes not vital economically and consumes much power (which is also difficult to deliver); —There is no good technical solutions so far to cancel crosstalk between DPUs because of lack of direct connection between them and latency in case one likes to connect them via the network.

Use of virtualization allows performing majority of heavy processing tasks at the central office (or even in the cloud), but it also requires a very strict timing synchronization between all DPUs which lines participate in the vectored group. This timing synchronization is missing in systems today, and thus, could be resolved according to aspects herein.

Figure 2:
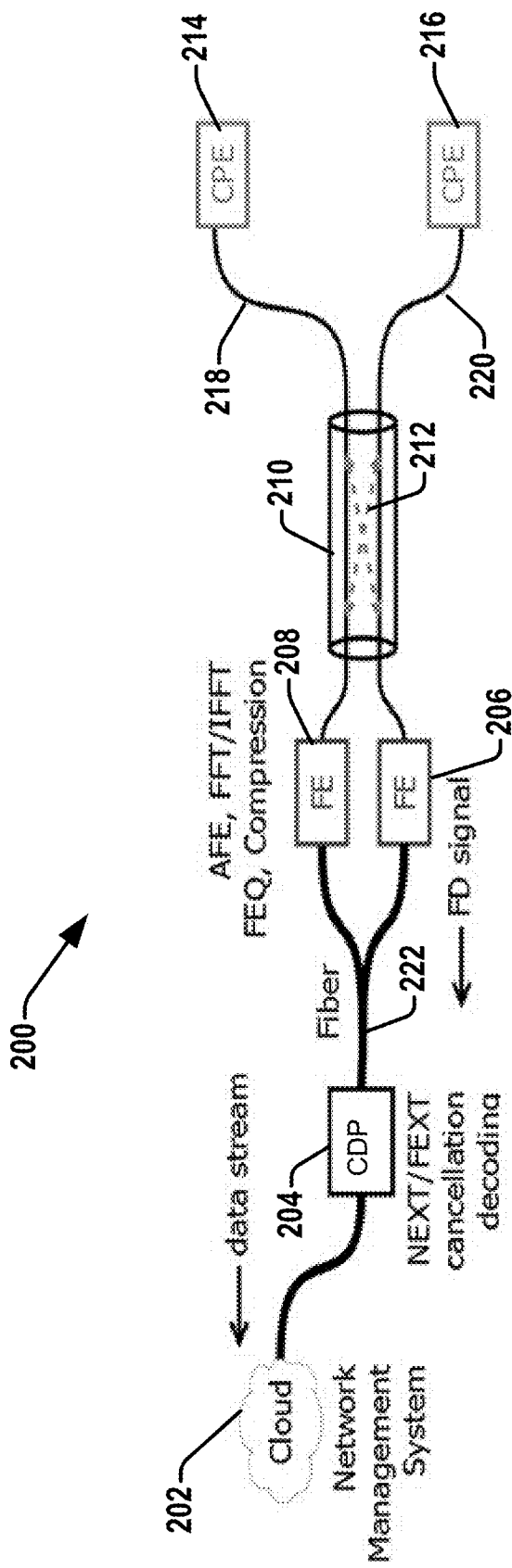
FIG. 2 is an example split virtualization of signal processing tasks between FE, CO and cloud component according to various aspects described.

Referring to FIG. 2, illustrated is an example of a split of signal processing tasks between FEs and the CDP that can be located at a central office (CO) or service cabinet, or other similar location, and a cloud in a vectored architecture 200 for a premises. The cloud 202 can comprise or represent any one or more of a server storage, memory, data store, processor, processing component, or other circuitry that enables storage and processing of data over a network and external to the distribution point architecture including the FEs 206, 208, binder 210 and CPEs 214 and 216, for example. The cloud can be a network cloud component, for example, that is configured as a network management system for one or more applications, networks, or network architectures. The cloud 202 connects via a data stream to a CDP of a central office 204 or servers as a central office itself thereat. The CDP 204/network cloud component 202 connects to the FE components 206, 208 via a fiber optic line, in which the FEs 206, 208 further connect to CPEs 214, 216 via access lines separately through a binder 210.

Various embodiments include that DPUs/FEs 110, 132, 134, 136 sourcing lines which have considerable mutual crosstalk are virtualized, i.e., all DPUs (e.g., 110)/FEs 206, or 208 are connected via a wideband fiber with relatively low propagation delay (passive optical network (PON) or point to point (P2P) fiber) to a central point (e.g., a powerful processor at the CDP 204 or in the cloud 202 as a network cloud component) that can implement one or more major signal processing tasks of the connected DPUs (e.g., 110)/FEs 206, or 208, including crosstalk cancellation (e.g., NEXT, FEXT, or the like) processing currently done in each DPU (or FE), for example.

One example for the task split between FE 206, 208 and CDP/cloud 204, 202 is shown in FIG. 2. In this case cancellation of the crosstalk 212 (near-end crosstalk, NEXT and far-end crosstalk-FEXT) between the wire pairs 218, 220 (each line as one or more lines) in the binder 210 is not performed at the FE 206, 208, but moved from the FE (or DPU) to the CDP 204 as a virtualization of signal processing tasks/functions, to which multiple FEs or DPUs are connected via fiber 222. Other signal processing tasks can also be moved/virtualized to the CDP 204 or cloud 202 in part or whole (e.g., analog front end (AFE) processing tasks, compression, frequency domain equalization (FEQ), fast Fourier transform (FFT) processing, inverse FFT or the like). With this, timing synchronization of signals transmitted by each FE 206, 208 to the associated CPE 214, 216 via a copper line can also be established.

In an aspect, a timing synchronization between DPUs 206, 208 (or otherwise, e.g., 110, 132, 134, 136, or a combination) that have been virtualized at the CDP, using cloud 202 or at the CDP 204. For mutual NEXT/FEXT cancellation between copper lines sourced from the DPUs/FEs connected to the CDP/cloud, all these DPUs/FEs belong to the same vectored group and a precise relative timing can be configured at all DPUs/FEs 206, 208 that can have mutual crosstalk to be cancelled.

The timing alignment between different FEs 206, 208 can be achieved by establishing a precise timing reference in each of the FEs 206, 208 that allows to adjust the timing of both upstream and downstream signals over the wired pair(s) 218, 220 associated with these FEs 206, 208 appropriately. This precise timing could be also maintained during steady state operation (showtime/active operation/transmission) of these FEs 206, 208, which can operate corrections/tuning of the timing also during showtime or active transmission. The established timing reference, after the mentioned correction/tuning, has to provide the accuracy of timing alignment between all the lines of the vectored group, which can be less than 1 us, based on similar requirements in case no virtualization is applied.

Figure 3:
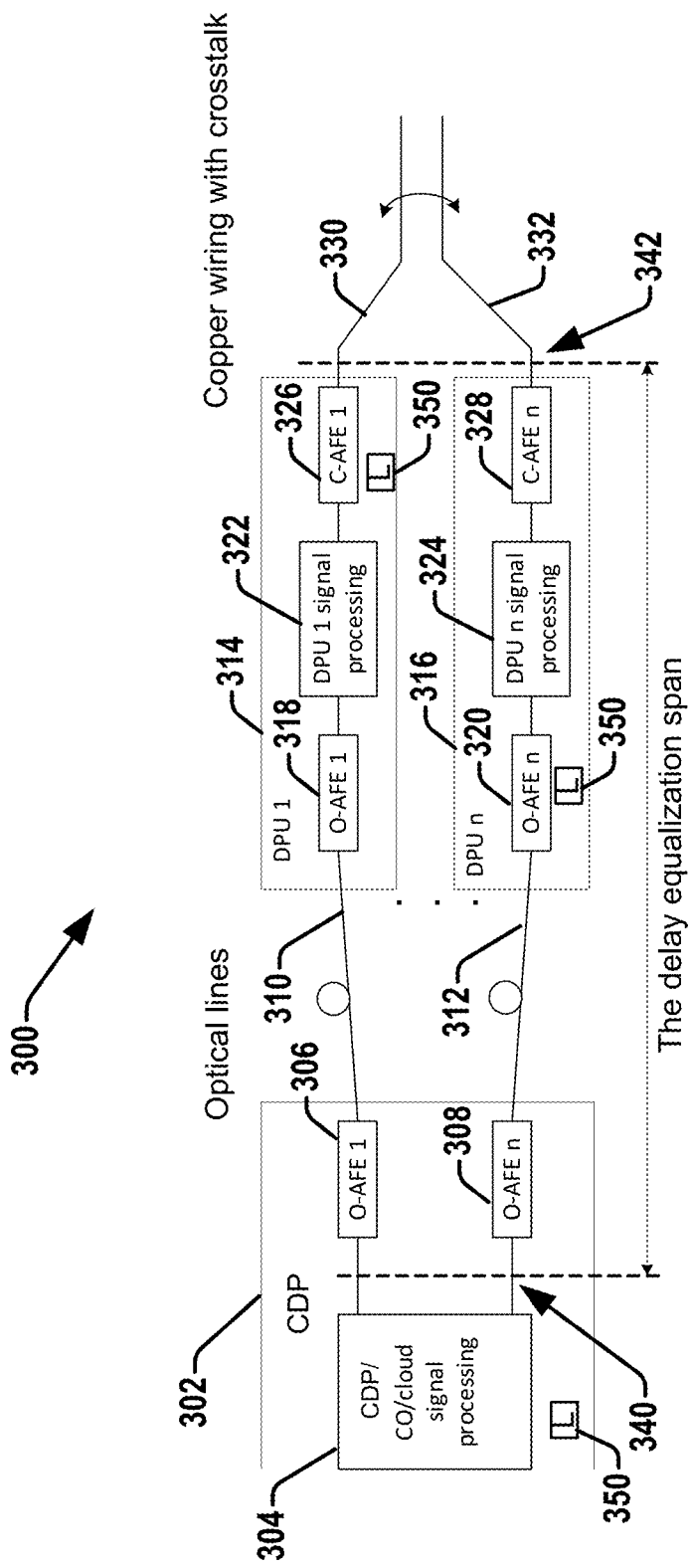
FIG. 3 is an example reference model of virtualized signal processing serving multiple DPUs/FEs according to various aspects described.

Referring to FIG. 3, illustrated is a functional diagram of multiple DPUs, in which processing is virtualized inside a CDP at the CO/cloud network in accord with various aspects/embodiments herein. The CDP 302 at a CO or a cabinet or component of a cloud is configured to perform virtualization of signal processing tasks from a DPU (e.g., 314 or 316) or an FE (e.g., 206, 208 of FIG. 2). The virtualization can be performed by the CDP or by using a cloud, or shared. The DPUs 314, 316 (as DPU 1 thru DPU n, where n is any positive integer) can be any number of DPUs (or FEs) connected to a processing unit/component 304 of the CO/cloud via optical links 310, 312 (similar as in FIG. 2) and optical analog front ends (O-AFE) 306, 308, 318, 320 as optical (O-AFE 1 to O-AFE n) and copper analog front ends (C-AFE) 326, 332 (C-AFE 1 to C-AFE n), respectively. For mutual crosstalk cancellation, the timing of the transmit and receive signals at the CDP (at CO/cloud) 302 have to be aligned for proper signal processing (e.g., via the DPU signal processing component 322, 324). The transmission timings at all the DPUs/FEs 314, 316 towards the copper lines 330, 332 have to be aligned for proper FEXT cancellation at the CPEs, as well (and same at the associated CPEs, if full duplex transmission is desired). To get both, the differential delays in the entire path from the CO/cloud processor 304 to the copper 330, 332, which is called "delay equalization span", associated with each DPU or FE 314, 316, shall be zeroed.

In another embodiment, a binder of multiple wire pairs can be used instead of optical (fiber-optical) lines 310. The multiple wire pair binder includes many wire pairs loaded with G.fast or even with VDSL2 bonded among themselves to provide wide-band backhaul, with parameters that are similar to an optical line.

The delay equalization span indicates set(s) of reference points 340, 342 between which the delay needs to be equalized. It comprises a span from the optical AFEs at CDP 302 and at a DPU (e.g., 314, 316), and the optical line (e.g., 310, 312), and the delays in the DPU processing part (e.g., 322, 324), and copper AFE (326, 328).

This delay equalization can be implemented by latency adjustment elements (LAE) 350 incorporated into the CDP processing unit 304 or into any of the elements/components of delay equalization span: at the CDP 302 or at the corresponding DPUs 314, 316.

Figure 4:
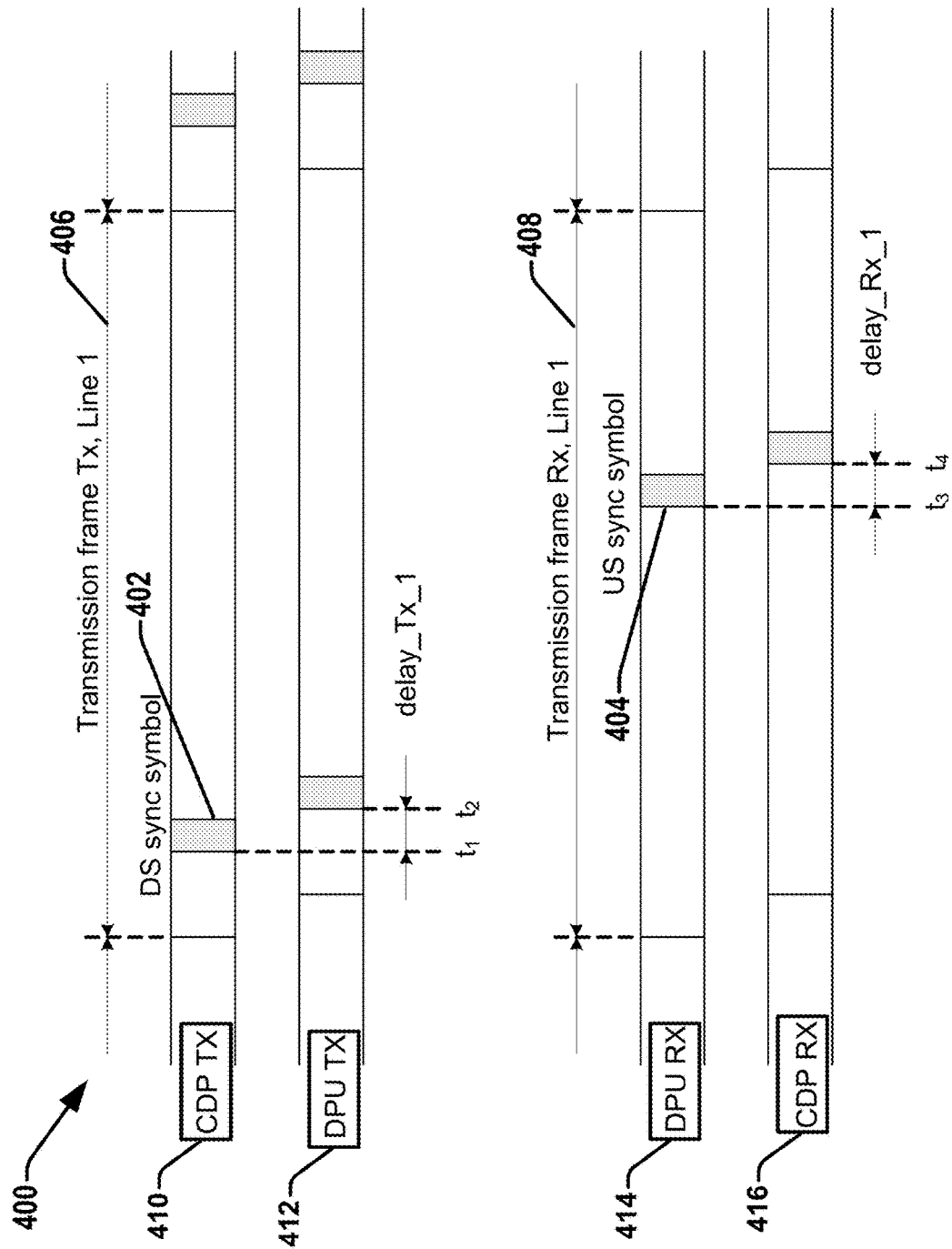
FIG. 4 is an example diagram illustrating time marks at a DPU and CO/cloud associated with first samples of sync upstream (US) and downstream (DS) symbols according to various aspects described.

Referring to FIG. 4, illustrated is an example of time markers at the DPU (314, 316) and the CDP (CO/cloud 302, 202) associated with the first samples of the sync US 404 and sync DS symbols 402 in order to establish a timing reference (local time reference, or the like) at the DPU/FE 314, 316. First, all the DPUs 314, 316 connected to a single CO/cloud processing unit/component 304 establish loop timing, so that a master clock frequency in each DPU 314, 316 is synchronized to the master clock of the CDP processing unit 304. Further, each CPE (e.g., 214, 216, or the like) connected to a DPU or FE 314, 316 is in loop timing with the DPU 314, 316, i.e., its master clock is locked to the master clock of the DPU 314, 316, respectively, and accordingly, to the master clock of the CDP processing unit 306.

To synchronize absolute time reference at the CDP/CO/cloud (e.g., 204, 202, or the like 302) and all DPUs 314, 316, some particular symbols in each line can be assigned for timing alignment purposes, such as, for example, sync symbols, which can be transmitted at known positions of the frame 406, 408 in upstream and downstream directions, respectively. In each of these assigned symbols a particular sample (e.g., sample m) can be selected to serve as a time reference for delay equalization. Further, each DPU transmitter 412 and receiver 414 can record the local time at which sample m of timing alignment symbol crosses the boundary of delay equalization span at the DPU 314, 316, and each CDP (CO/cloud) transmitter 410 and receiver 416 can record the local time at which sample m crosses the boundary of delay equalization span at the CDP 204/302.

The sum of the delays in a given span or line k experienced by sample m in upstream and downstream ($t_{RTD}$) can be computed as: $t_{RTD}(k)=[[t_2(k)+\Delta T_{DPU}]-t_1(k)]+[t_4(k)-[t_3(k)+\Delta T_{DPU}]]=[t_2(k)-t_3(k)]+[t_4(k)-t_1(k)]$, where $\Delta T_{DPU}$ is a shift between time references at the CDP (e.g., 204, 302) and DPU-k (314, 316) that is different at each DPU, but doesn't impact the results).

The delay can be different in upstream and downstream. With this assumption the downstream delay, $td_{DS}$ can be computed as: $t_{RTD}=td_{US}+td_{DS}=2\ td_{DS}+\Delta T_{US-DS}$, and $td_{DS}=(t_{RTD}-\Delta T_{US-DS})/2$, where $\Delta T_{US-DS}$ is the difference between upstream (US) and downstream (DS) delay of the delay equalization span. This value of $\Delta T_{US-DS}$ depends mainly on DPU (314, 316) implementation (because the latencies of optical lines are roughly the same in both transmission directions). This value is specific for a DPU (314, 316), and thus, the vendor of the DPU (314, 316) can find out the particular value and report it to the CDP (204, 302) at initialization of the DPU (314, 316). This allows the CDP (204, 302) to determine $td_{DS}$ for each DPU (314, 316). Further, a precise local timing reference $t_1$ at the CDP (204, 302) can be obtained in each DPU (314, 316) as: $t_1(N)=t_2(N)-td_{DS}$, where, again, $t_2(N)$ is the locally measured value of $t_2$ at the DPU(N) (314, 316).

Further, as each DPU (314, 316) gets a timing reference synchronized with CPU (204, 302), a synchronized and mutually aligned transmission timing can be established at all DPUs (314, 316) by adding to each DPU (314, 316) a shift of reference local timing by a value of $\Delta(N)$. Since the reference timing at the CPU (204, 302) is the same for all lines, i.e., $t_1(1)=t_1(2)=\ldots=t_1(N)$, this additional shift for line N can be equal to $\Delta(N)=TD_{DS}-td_{DS}(N)$, where $TD_{DS}$ is the selected reference delay equalization span for the vectored group. The $TD_{DS}$, obviously, can be selected in the way that the values of $\Delta$ in all lines are not negative, i.e., based on a DPU/FE (314, 316) with the biggest value of $td_{DS}$.

The value of time shift $\Delta(N)$ is computed by the CO/cloud processing unit 304 and communicated back to the DPU(N) (314, 316) (e.g., for DPU processors 322, 324) prior to initialization of the copper part 330, 332 of the line. These values can be updated via the embedded operations channel (EOC) or other management channel during showtime (data transmission), if necessary. The time shift can be implemented by any LAE within the downstream transmission path forming the delay equalization span. A typical implementation of the LAE 350 can be a small FIFO at one or more of the DPU (314, 316).

With the procedure described above, if each DPU reports the difference in delay between upstream and downstream ($\Delta T_{US-DS}$) and periodically reports the measured value of ($t_2-t_3$), the CO/cloud processor 304 can identify the actual downstream delay to each DPU ($td_{DS}$), synchronize the local time reference of each DPU (314, 316) with the CO/cloud processing unit 304, and provide a mutual transmission timing reference for all DPUs (314, 316).

However, this procedure requires active transmission between DPUs (314, 316) and associated CPEs (e.g., 214, 216, or the like), while a new joining DPU/FE (e.g., DPU n 316) can't start transmitting before its transmission timing reference is synchronized, because transmission with arbitrary timing reference can damage other lines in the vectored group. Therefore, the initial transmission timing reference need to be created before the joining DPU/FE (e.g., DPU/FE n 316) starts transmission signals over copper, i.e., before its first transmission. This initial transmission timing reference can be further adjusted during the initialization and/or showtime.

One way of establishing initial transmission timing reference is to create an internal loopback between the DPU-TX 412 and DPU-RX 414 reference points, so that for this DPU ($t_2-t_3$)=0 or any other predefined value. This value, if non-zero, can be considered as an additional delay in the upstream direction and communicated to the CO/cloud (204, 202, 302) together with $\Delta T_{US-DS}$ (or as a part of it). Further, with the procedure described above, the CO/cloud processing unit 304 can compute $td_{DS}=[t_4(k)-t_1(k)-\Delta T_{US-DS}]/2$ and the DPU/FE (e.g., DPU/FE n 316) can create its initial transmission timing reference by shifting its local timing reference by $\Delta=TD_{DS}-td_{DS}$. This transmission timing reference can then be synchronized with initial transmission timing references of all active DPUs/FEs (314, 316) of the vectored group (which affects one another with crosstalk at a same premises, such as in a same binder or the like).

Using the initial transmission timing reference, the DPU/FE (e.g., DPU/FE n 316) can still not be allowed to transmit because this timing reference does not account the potential topology of copper wiring. In some cases, however, use of initial timing reference is acceptable because it is sufficiently accurate if the delays in the copper wires running from the DPU/FE to the point of their joining into the binder (see FIG. 7) are: —all approximately the same; —small comparing to the length of cyclic extension.

In an aspect, updates of transmission timing reference can be performed. The inaccuracy of the initial transmission timing reference is expected to be small and can be further reduced by later updates. Update during showtime can be done as described herein, by re-estimating the obtained values of $t_1$-$t_4$ and $t_2$-$t_3$ for each FE or DPU (314, 316), and re-computing the transmission timing reference. The update could be controlled by the CO/cloud processing unit 302. The transmission timing reference can also be updated if the reference delay equalization span $TD_{DS}$ changes, as described herein.

Figure 5:
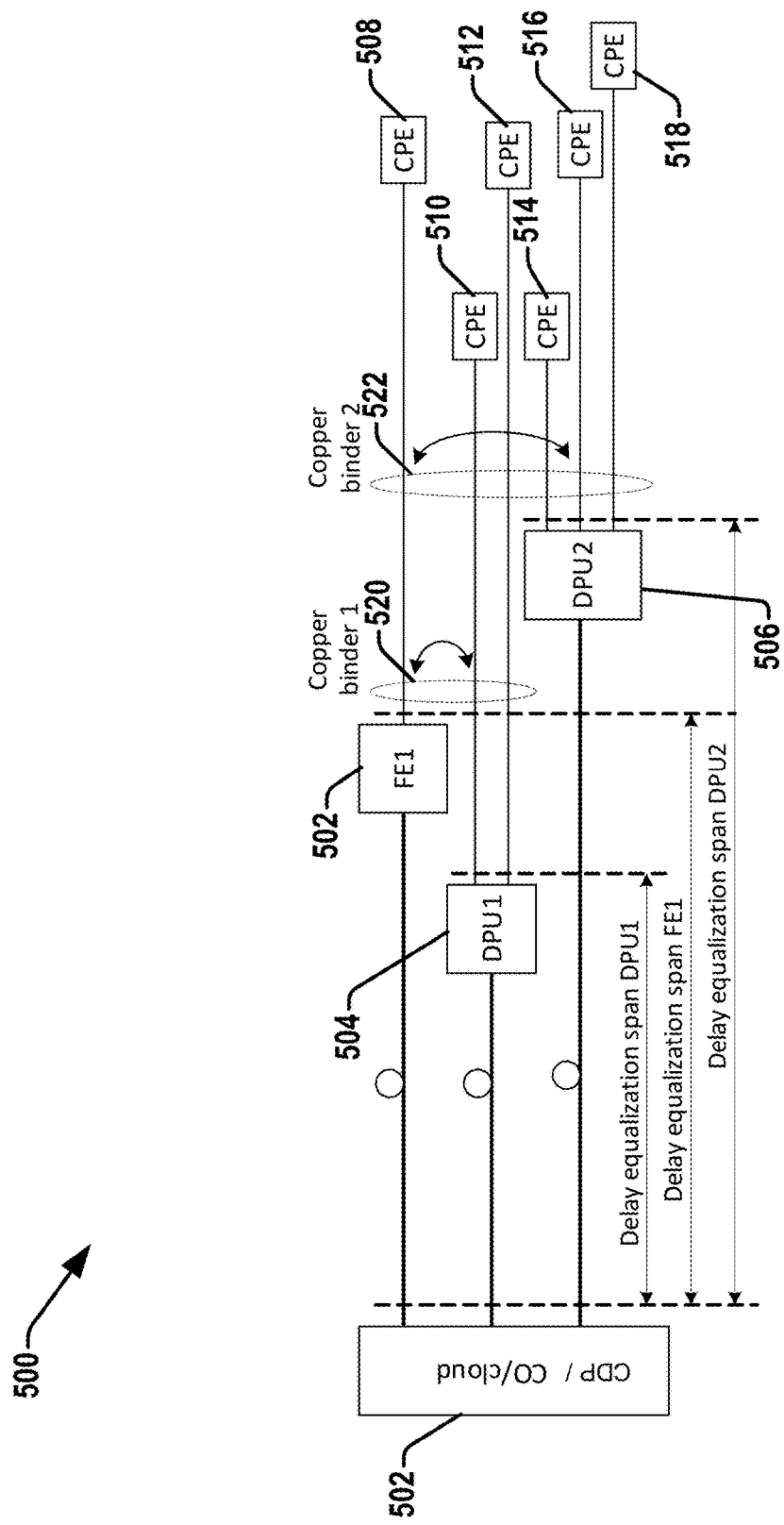
FIG. 5 is an example of a deployment with multiple DPUs/FEs with different delay equalization spans in accordance with various aspects described.

Referring to FIG. 5, illustrated is an example of a deployment with multiple DPUs/FEs 502, 504, 506 having different delay equalization spans, as possible with other illustrative aspects or descriptive figures herein. As such, the CO/network cloud or CDP component 502, processor or processing circuitry therein, can operate to select a reference delay equalization span for channel estimation and synchronization operations in the CDP, addressing the plurality of DPUs/FEs.

The example system 500 of FIG. 5 illustrates two DPUs 504, 506 (as DPU 1 and DPU 2) and a FE 502 (as FE1), all with different delay equalization spans: the copper pairs sourced from DPU1 504 can be merged with the pair sourced by FE1 502 into the copper binder 1, 520, which further merges with copper pairs sourced by DPU2 506 into the copper binder 2, 522.

The case shown here in FIG. 5, for proper time equalization, the reference delay equalization span $TD_{DS}$ could be selected (e.g., by CO/cloud or CDP component 502) as the delay span of DPU2 506, which is the one with longest delay $td_{DS}$ ("delay equalization span DPU2").

If a new DPU/FE (e.g., DPU n) joins the group, and the downstream delay $td_{ds}$ for it is less than the $TD_{DS}$, no changes in timing alignment of other DPUs/FEs would be required and same reference delay equalization span can be used. However, if the $td_{ds}$ associated with the joining DPU/FE (e.g., DPU n) exceeds $TD_{DS}$, the value of $TD_{DS}$ needs to be updated (increased) synchronously in all lines.

Figure 6:
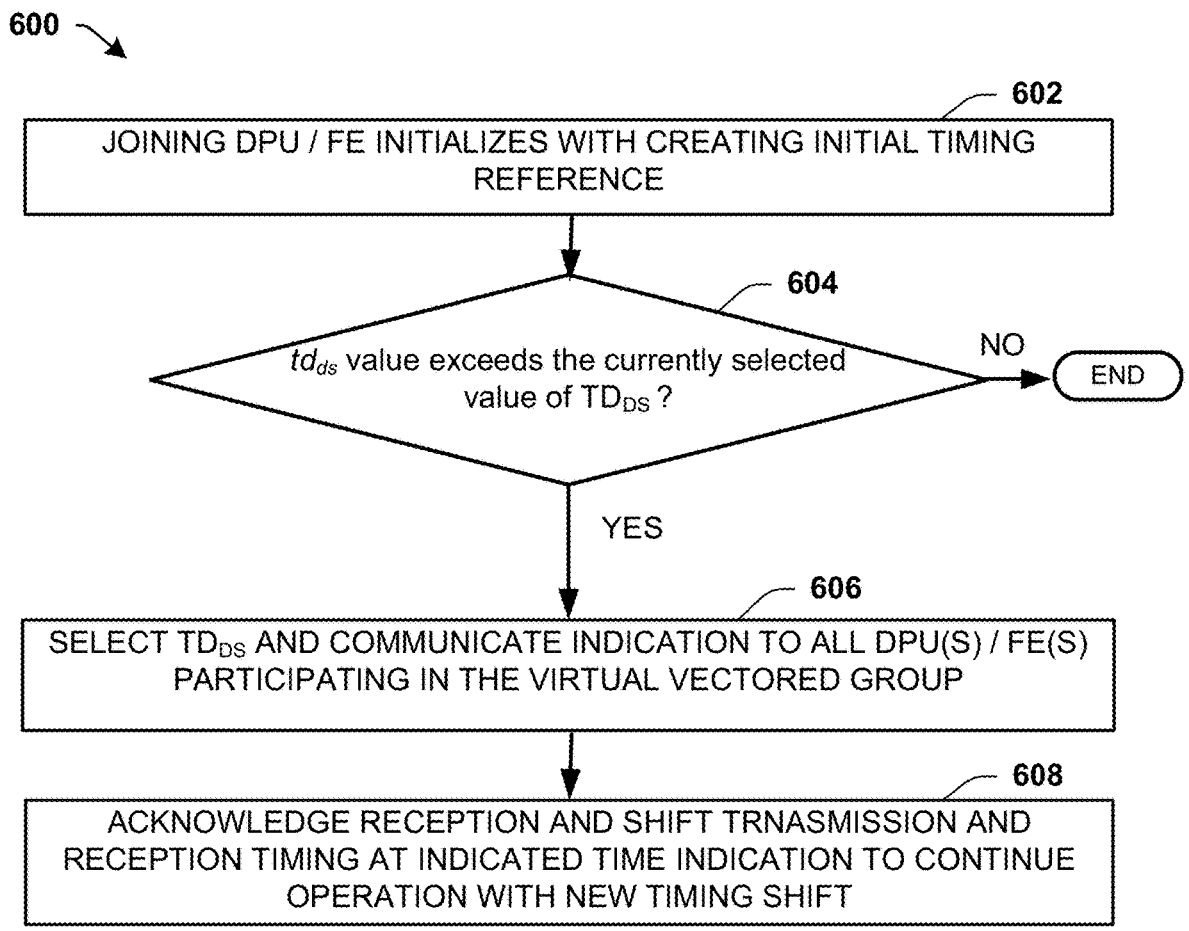
FIG. 6 is an example process flow for timing alignment in DPUs/FEs connected in a virtual distribution point in accordance with various aspects described.

In one embodiment, the updating procedure can be performed synchronously in all active DPUs 504, 506, or the like (those sourcing at least one active line) and all active FEs 502 or the like. The updating procedure includes the below acts, illustrated as a process flow 600 with brief reference to FIG. 6 as well.

At 602, the process flow initiates with the joining DPU/FE (e.g., 316 of FIG. 3) starting initialization by creating the initial timing reference and CO/cloud management obtains its $td_{ds}$ value. At 604, if the obtained $td_{ds}$ value exceeds the currently selected value of reference delay equalization span $TD_{DS}$, the CO/cloud management 302/502 initializes the $TD_{DS}$ update procedure. At 606, the CO/cloud management 302/502 selects a new value of $TD_{DS}$ and communicates it to all DPUs/FEs 502, 504, 506, 316 participating in the virtual vectored group and all the associated CPEs 508 thru 518 using a management channel accessible at both the DPUs/FEs 502, 504, 506, 316 and the CPEs 508 thru 518.

This communication also indicates to the DPUs/FEs 502, 504, 506, 316 and associated CPEs 508 thru 518 that: —the update procedure was initiated; —the actual time instant at which the entire vectored group will transition to the new value of $TD_{DS}$.

At 608, all the DPUs/FEs 502, 504, 506 and associated CPEs 508 thru 518 can acknowledge the reception of the communication, as well as the joining one DPU n or CPE. At the indicated time instant all the DPUs/FEs and all the associated CPEs shift their transmission and reception timing accordingly and continue operation with new timing shift $\Delta(N)$.

Figure 7:
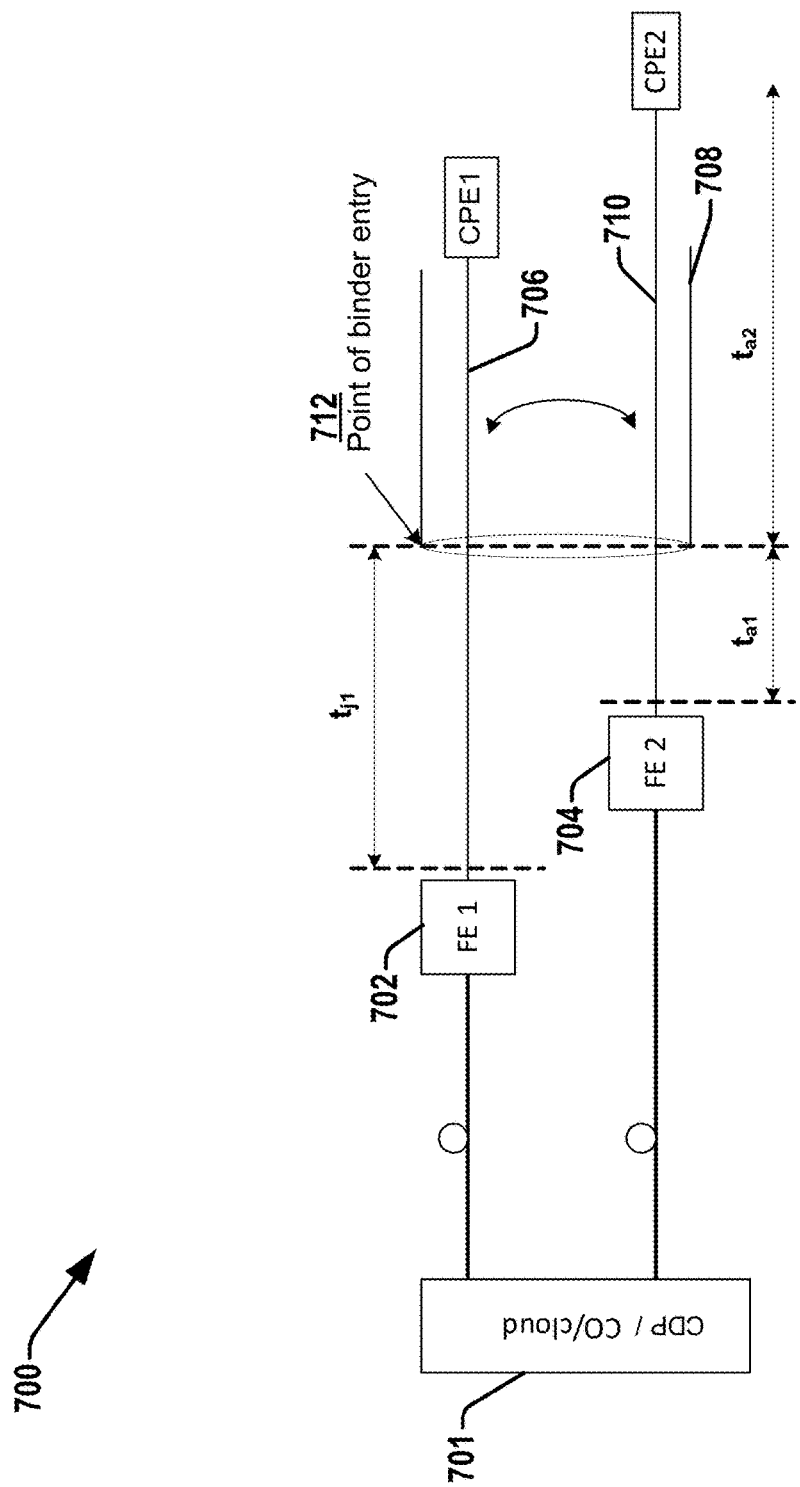
FIG. 7 is diagram of delays of copper lines between DPUs/FEs in accordance with various aspects described.

Referring to FIG. 7, illustrates an example of delays in a copper line between at least two FEs and a crosstalk-based method of obtaining a timing reference. The initial transmission timing reference obtained as described above accounts only for delays in the fiber link and can not give an accurate timing reference in case of non-colocated DPUs/FEs coupled to the CDP/CO/cloud component 701 (e.g., 702, 704, as well as other DPUs/FEs discussed herein), which can result in unknown delay between transmitters of different DPUs/FEs 702, 704, for example, as illustrated in FIG. 5 and FIG. 7, for example.

Copper lines 706 and 710 are connected to FE 1 702 and FE 2 704 introduce different delays prior they merge into the binder 708 (in which mutual crosstalk between the lines occurs). For best performance results, transmission timing in FE 1 702 and FE 2 704 can account these delays ($t_{j1}$ and $t_{a1}$), so that signals from FE 1 702 and FE 2 704 enter the binder at the same time. This will not be the case if both FE 1 702 and FE 2 704 use initial timing reference and $t_{j1} \neq t_{a1}$.

To overcome the described issue with transmission timing, each line joining the virtual vectoring group measures the symbol timing of the crosstalk from neighboring lines. It is assumed that active lines of the vectored group periodically transmit symbols with known content (e.g., sync symbols) in the upstream as well as in the downstream direction. The line can be sourced by an FE or by a DPU; in case other line(s) of this DPU are also active, the joining line can skip crosstalk measurement and use DPU timing or can use the obtained crosstalk measurement to adjust/update the established DPU timing.

The joining line 706 to CPE 1 is first silent to avoid transmissions with wrong timing. From the received crosstalk signal, the joining DPU/FE (e.g., 702) receiver derives the position of the sync symbols in active lines: this can be very accurately done, e.g., by a cross correlation in time domain of the received crosstalk signal with the known sync symbol content. With different content of sync symbols transmitted in upstream and downstream, the receiver of the joining line can measure the time position of both upstream and downstream symbols. From these obtained time positions by the FE, due to knowledge of the transmission frame format in upstream and downstream, and knowledge of the relative timing shift between symbols of upstream and downstream frames (determined by the applied timing advance), the joining FE (with assistance of the CO) can compute the value of $t_{j1}$. This value determines additional time shift of the initial timing reference of the joining DPU/FE which is necessary for timing alignment with other lines of the vectored group at the binder entry 712.

Considering the case in FIG. 7, assume that joining line 706 to FE1 702 and CPE 1 joining line and joining line 710 to FE2 704 and CPE 2 is an active line. For this case the following representation can be derived: $t_{nextus}=t_{a1}+t_{j1}$; $t_{fextus}=t_{a2}+t_{j1}$; $t_{direct\_active}=t_{a1}+t_{a2}$;
where:

$t_{nextus}$ is the NEXT coupling delay (from FE2 into FE1);

$t_{fextus}$ is the upstream FEXT coupling delay (from CPE 2 into FE1);

$t_{direct}$ active is the propagation delay between FE2 and CPE 2.

The propagation delay $t_{direct,active}$ is known already from the training of the line 706 with FE 2 702;

With this follows: $t_{j1}=(t_{nextus}+t_{fextus}-t_{direct\_active})/2$ and $t_{a1}=t_{nextus}-t_{j1}$.

Figure 8:
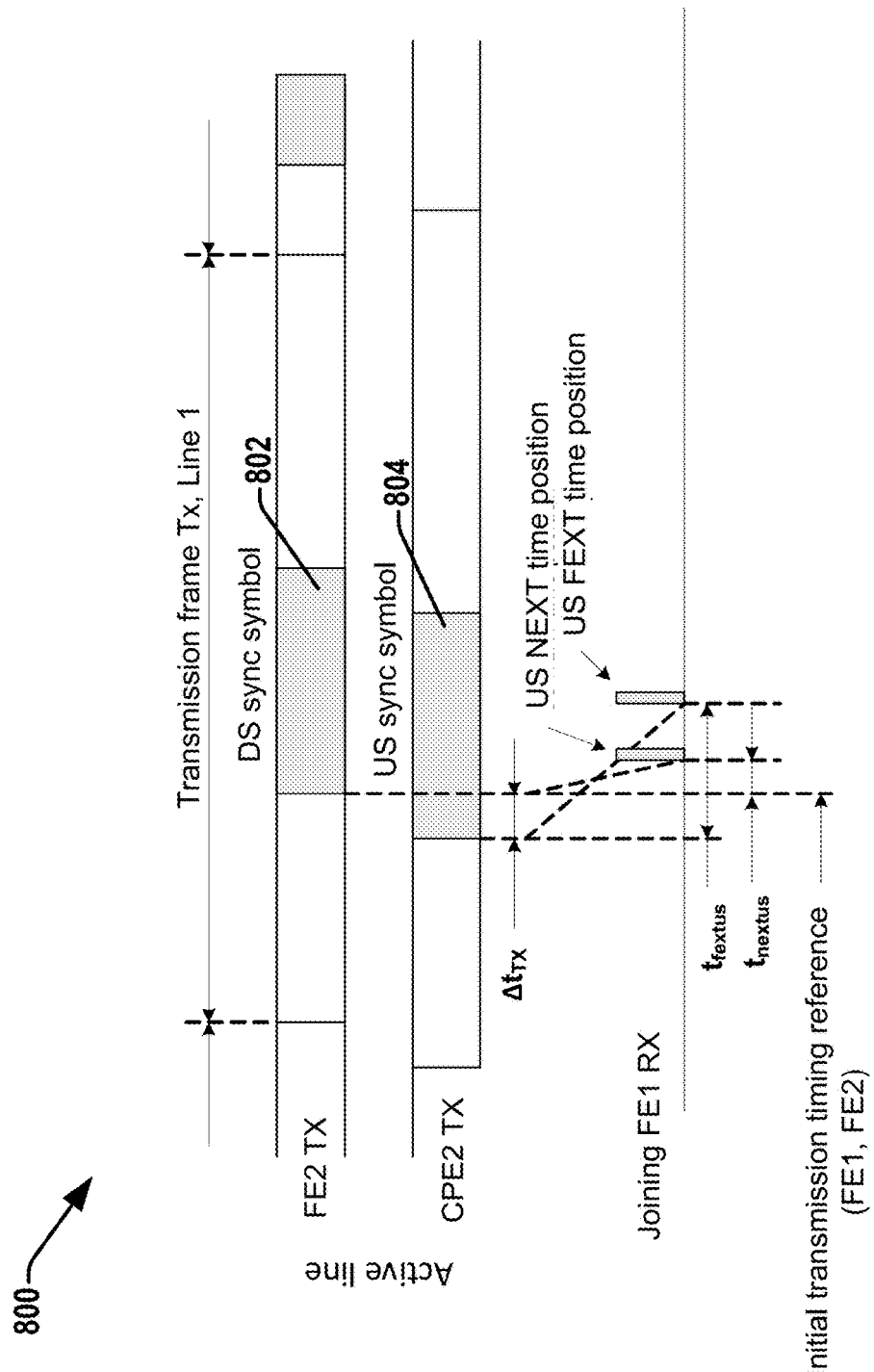
FIG. 8 is diagram of delays of crosstalk signals relative to initial transmission timing reference in accordance with various aspects described.

Referring to FIG. 8, illustrated are example delays of crosstalk signals relative to initial transmission timing. Example, measurement of delays $t_{nextus}$ and $t_{fextus}$ are shown in FIG. 8. The instants of time associated with US NEXT sourced from FE1 and US FEXT sourced from CPE2 can be derived by (CO/cloud or FE/DPU processing component) using cross-correlation with DS and US sync symbols, 802, 804, respectively. The receiver of joining line measures the delay of the detected time instants relative to the initial transmission timing reference; further, to obtain the actual values of delays $t_{nextus}$ and $t_{fextus}$, the joining receiver FE1 702 can account for a potential shift between transmission instants of upstream and downstream sync symbols, $\Delta T_{TX}$. The value of $\Delta t_{TX}$ depends on the timing advance applied by the CO/cloud processor and thus this value is known at the CO/cloud.

The mentioned assistance from the CDP (e.g., 302) can be in two ways: the FE communicates to the CDP over the fiber link the obtained time positions of upstream and downstream sync symbols, and CDP computes the associated $t_{j1}$ and sends it to the FE1. Alternatively, the CDP communicates to the FE1 702 all the necessary data (transmission frame format, values of $TA_{ds}$ and $t_{direct\_active}$ of line FE2 704) and FE performs computation of $t_{j1}$ by itself, and FE reports it to the CDP 204, 302, which can use it also for computation of $TA_{ds}$ for line FE1 702. The downstream timing advance is used in addition to the CPE-side timing advance $\Delta t_{TX}$ as shown, where the upstream transmission is shifted in time relatively to the time of receiving downstream symbols.

The value of $TA_{ds}$ is selected for each line to obtain time synchronization of the signals at a certain point of the binder, for example the point of entry to the binder as shown in FIG. 7. Optimal performance for the given cyclic extension can be achieved by selecting (assuming that the active line uses $TA_{ds}=0$): $TA_{ds}$ (FE1)=$t_{j1}-t_{a1}$.

This process or set of operations can adjust all joining lines to the timing if the first line which has been activated. In case that the crosstalk coupling between the active lines and the joining line is weak, the method will not give an accurate result. However, in case of low crosstalk between the lines, precise synchronization is not performance relevant and $t_{j1}=0$ can be assumed.

Embodiments/aspects include where an MGFAST system where multiple DPUs or FEs where the physical layer signal processing tasks are split between local DPU/FE tasks, and the CDP, which performs synchronization, vectoring, and other tasks. Further, timing synchronization can be done between DPUs/FEs, which are coordinated at a central point (e.g., the CDP at the CO or cloud), including the following:

Timing synchronization of all DPUs/FEs to the CDP master clock (loop timing)

Timing synchronization of all CPEs to the associated DPUs/FEs (loop timing)

Delay estimation of the fiber and the DPU (CDP<->DPU/FE, the delay equalization span)

Establishing a synchronous timing reference at each DPU/FE of the vectored group (initial timing reference)

Timing equalization and procedure of updating timing synchronization of the DPUs (adjustment of delay equalization spans)

Delay estimation of the copper line (DPU/FE<->CPE)

Delay estimation and transmission timing adjustment between active and joining lines using crosstalk generated by the signals on the copper wires Fine adjustment of delay equalization span of joining lines Coordination of the upstream and downstream transmit and receive timing to allow crosstalk cancellation and frequency domain equalization Interaction between CO/cloud processor and associated DPUs/FEs and central control/management of the procedure from CO/cloud.

Figure 9:
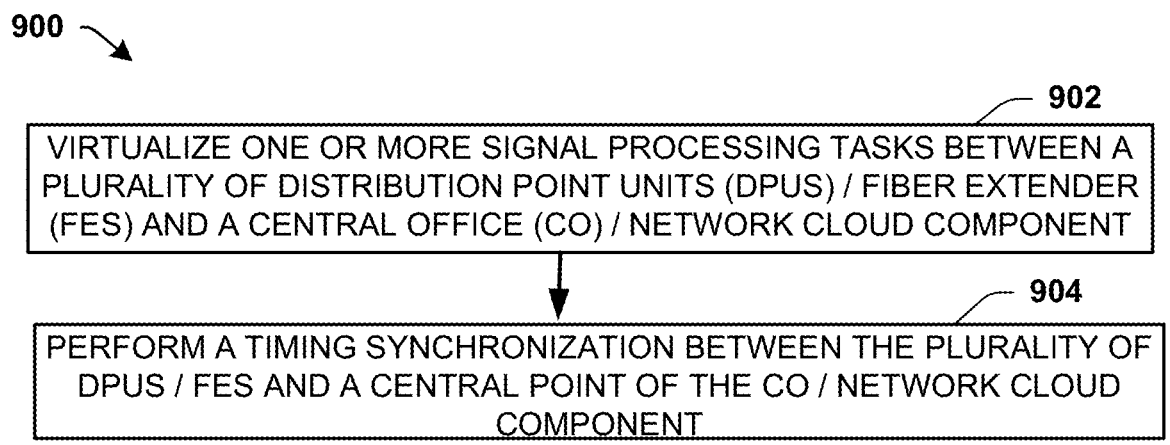
FIG. 9 is an example process flow for timing alignment in DPUs/FEs connected in a virtual distribution point in accordance with various aspects described.

FIG. 9 illustrates another example process flow 900 for a communication system of a customer premise at a CO processor or network cloud component. The process flow initiates at 902 with virtualizing, via one or more processors, one or more signal processing tasks between a plurality of distribution point units (DPUs)/fiber extender (FEs) and a central office (CO)/network cloud component.

At 904, the process flow 900 comprises performing, via the one or more processors, a timing synchronization between the plurality of DPUs/FEs and a central point of the CO/network cloud component.

In other embodiments, the process flow can comprise performing mutual crosstalk cancelation between the plurality of DPUs/FEs and the central point. The virtualizing the one or more signal processing tasks can comprise moving a crosstalk cancelation operation, comprising at least one of: a near-end crosstalk (NEXT) or a far-end crosstalk (FEXT), from the plurality of DPUs/FEs to the CO/network cloud component, and performing the crosstalk cancelation at the CO/network cloud component.

A timing synchronization of signals transmitted by the plurality of DPUs/FEs to associated customer premise equipments (CPEs) across a vectored group of lines having a crosstalk therebetween can further be performed. Establishing a timing reference in the plurality of DPUs/FEs can enable an adjustment of a timing of both upstream and downstream signals over lines in a same vectored group associated with the plurality of DPUs/FEs for a delay estimation. The timing between DPUs/FEs can be maintained during a steady state operation of the plurality of DPUs/FEs within the same vectored group based on the timing reference by performing an update of the timing to improve an accuracy of a timing alignment of the lines in the same vectored group.

Figure 10:
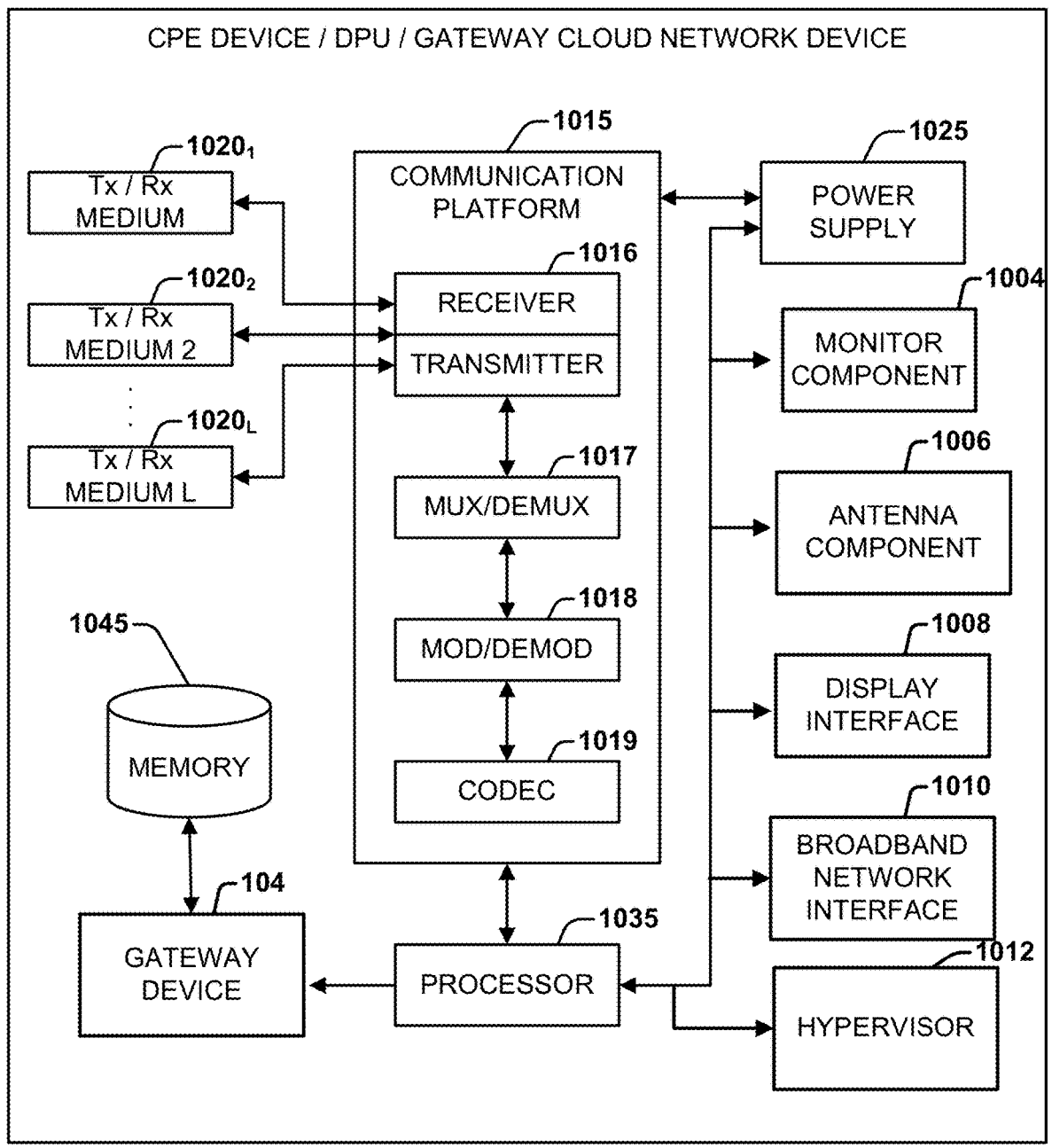
FIG. 10 is an exemplary wireless terminal, DPU, FE, CPE, gateway device or user device for implementing various aspects described for timing alignment in DPUs/FEs connected in a virtual distribution point.

In order to provide further context for various aspects of the disclosed subject matter, FIG. 10 illustrates a non-limiting example of a computing device, such as a laptop, tablet, user equipment (e.g., mobile phone), user device, gateway network device (e.g., a device communicatively coupled to a home network with gateway device), the CPE 140, 150, 160, the DPU 110 or otherwise described herein with other reference numerals in exemplary figures, or other communication device or wireless terminal 1000 that can implement some or all of the aspects/components described herein. In an aspect, wireless terminal, such as a laptop, tablet, other communication device, or wireless terminal 1000 can receive and transmit signal(s) to and/or from wireless/wire-line devices such as APs, access terminals, wireless ports and routers, or the like, through a set of L transmit/receive medium 1020, such as a fiber line, copper line, or other medium for transmission, which can be configured according to one or more embodiments or aspects described herein. In one example, transmit/receive medium 1020 can be implemented as part of a communication platform 1015, which in turn can comprise electronic components and associated circuitry and/or other means that provide for processing and manipulation of received signal(s) and signal(s) to be transmitted. In an aspect, communication platform 1015 can include a monitor component 1004 and antenna component 1006, which can couple to communication platform 1015 and include electronic components with associated circuitry that provide for processing and manipulation of received signal(s) and other signal(s) to be transmitted. The communication platform 1015 can further comprise a receiver/transmitter or transceiver 1016, which can transmit and receive signals and/or perform one or more processing operations on such signals (e.g., conversion from analog to digital upon reception, conversion from digital to analog upon transmission, etc.). In addition, transceiver 1016 can divide a single data stream into multiple, parallel data streams, or perform the reciprocal operation.

Additionally, the communication device 1000 can include display interface 1008, which can display functions that control functionality of the device 1000, or reveal operation conditions thereof. In addition, display interface 1008 can include a screen to convey information to an end user. In an aspect, display interface 1008 can be a liquid crystal display, a plasma panel, a monolithic thin-film based electro chromic display, and so on. Moreover, display interface 1008 can include a component (e.g., speaker) that facilitates communication of aural indicia, which can also be employed in connection with messages that convey operational instructions to an end user. Display interface 1008 can also facilitate data entry (e.g., through a linked keypad or through touch gestures), which can cause access equipment and/or software 1000 to receive external commands (e.g., restart operation).

Further, a hypervisor 1012 can be executed to provide an execution environment for one or more network slices/sub-slices to utilize the hardware resources Broadband network interface 1020 facilitates connection of access equipment and/or software 1000 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1010 can be internal or external to access equipment and/or software 1000, and can utilize display interface 1008 for end-user interaction and status information delivery.

Processor 1035 can be functionally connected to communication platform 1008 (as the DPU 110) and can facilitate operations on data (e.g., symbols, bits, or chips) for multiplexing/de-multiplexing, such as effecting direct and inverse fast Fourier transforms, selection of modulation rates, selection of data packet formats, inter-packet times, and so on. Moreover, processor 1035 can be functionally connected, through data, system, or an address bus, to display interface 1008 and broadband network interface 1010, to confer, at least in part, functionality to each of such components.

In another example, a multiplexer/de-multiplexer (mux/demux) unit 1017 can be coupled to transceiver 1016. Mux/demux unit 1017 can, for example, facilitate manipulation of signal in time and frequency space. Additionally or alternatively, mux/demux unit 1017 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 1017 can scramble and spread information according to substantially any code generally known in the art, such as Hadamard-Walsh codes, Baker codes, Kasami codes, polyphase codes, and so on.

In a further example, a modulator/demodulator (mod/demod) unit 10110 implemented within communication platform 1015 can modulate information according to multiple modulation techniques, such as frequency modulation, amplitude modulation (e.g., L-ary quadrature amplitude modulation (L-QAM), etc.), phase-shift keying (PSK), and the like. Further, communication platform 1015 can also include a coder/decoder (codec) module 1019 that facilitates decoding received signal(s) and/or coding signal(s) to convey.

In a further aspect, processor 1035 can be functionally connected to communication platform 1015 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 1035 can be functionally connected, via a data or system bus (e.g., a wireless PCIE or the like), to any other components or circuitry not shown in system 1000 to at least partially confer functionality to each of such components, such as by the antenna systems disclosed herein.

As additionally illustrated, a memory 1045 can be used by wireless terminal 1000 to store data structures, code instructions and program modules, system or device information, code sequences for scrambling, spreading and pilot transmission, location intelligence storage, determined delay offset(s), over-the-air propagation models, and so on. Processor 1035 can be coupled to the memory 1045 in order to store and retrieve information necessary to operate and/or confer functionality to communication platform 1015 and/or any other components of wireless terminal 1000.

FIG. 11 is a block diagram illustrating components, according to some example embodiments, of a system 1100 to support Network Functions Virtualization (NFV) for one or more virtualization functions of a CO/network cloud component/CDP from a DPU/FE, for example, discussed herein. The system 1100 is illustrated as including a virtualized infrastructure manager (VIM) 1102, a network function virtualization infrastructure (NFVI) 1104, a VNF manager (VNFM) 1106, virtualized network functions (VNFs) 1108, an element manager (EM) 1110, an NFV Orchestrator (NFVO) 1112, and a network manager (NM) 1114.

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1106 may manage the VNFs 1108. The VNFs 1108 may be used to execute EPC components/functions.

The VNFM 1106 may manage the life cycle of the VNFs 1108 and track performance, fault and security of the virtual aspects of VNFs 1108. The EM 1110 may track the performance, fault and security of the functional aspects of VNFs 1108. The tracking data from the VNFM 1106 and the EM 1110 may comprise, for example, performance measurement (PM) data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an processing function, component, or slice). The NM 1114 may provide a package of end-user functions with the responsibility for the management of a network, which may include network elements with VNFs, non-virtualized network functions, or both (management of the VNFs may occur via the EM 1110).

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

While embodiments of an example apparatus has been illustrated and described with respect to one or more implementations, alterations and/or modifications can be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Other examples of the various aspects/embodiments herein can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a method for communication system of a customer premise, comprising: splitting, via one or more processors, one or more physical layer signal processing tasks between one or more local distribution point unit (DPU) tasks of one or more DPUs, one or more fiber extender (FE) tasks of one or more FEs, one or more central office (CO) tasks of one or more COs, and one or more cloud tasks of one or more network clouds.

Example 2 can include the subject matter of Example 1, further comprising: performing, via the one or more processors, a timing synchronization between at least one of: the one or more DPUs or the one or more FEs, being coordinated at a central point comprising at least one of: the one or more COs or the one or more network clouds.

Example 3 can include the subject matter of any one of Examples 1-2, further comprising: virtualizing, via the one or more processors, the one or more local distribution point unit (DPU) tasks of one or more DPUs, the one or more fiber extender (FE) tasks of one or more FEs, or both the one or more local distribution point unit (DPU) tasks of one or more DPUs and the one or more fiber extender (FE) tasks of one or more FEs at a central point over a wideband fiber comprising a low propagation delay, the central point comprising at least one of: the one or more COs or the one or more network clouds; and performing, via the one or more processors, mutual crosstalk cancelation between the one or more local distribution point unit (DPU) tasks of one or more DPUs or the one or more fiber extender (FE) tasks of one or more FEs and the central point to cancel mutual crosstalk generated therebetween.

Example 4 can include the subject matter of any one of Examples 1-3, wherein the splitting, via one or more processors, the one or more physical layer signal processing tasks comprises moving a cross talk cancelation operation, comprising at least one of: a near-end crosstalk (NEXT) or a far-end crosstalk (FEXT), from the one or more DPUs or the one or more FEs and to the one or more COs, and performing the cross talk cancelation at the one or more COs, wherein the one or more COs comprise a plurality of FEs or DPUs connected thereat via a fiber or optic fiber connection.

Example 5 can include the subject matter of any one of Examples 1-4, further comprising: performing, via the one or more processors, a time synchronization of signals transmitted by each of the one or more DPUs and the one or more FEs to an associated customer premise equipment (CPE) via a copper line, wherein the one or more DPUs and the one or more FEs belong to a same vectored group.

Example 6 can include the subject matter of any one of Examples 1-5, further comprising: establishing, via the one or more processors, a precise timing reference in each of the one or more DPUs/FEs that allows to adjust a timing of both upstream and downstream signals over one or more wired pairs associated with one or more DPUs/FEs.

Example 7 can include the subject matter of any one of Examples 1-6, further comprising: maintaining, via the one or more processors, during a steady state operation of the one or more DPUs/FEs within a same vectored group a timing therebetween based on the precise timing reference, including performing a correction or a tuning of the timing to improving an accuracy of a timing alignment between communication lines of the same vectored group.

Example 8 can include the subject matter of any one of Examples 1-7, further comprising: performing, via one or more processors, a delay equalization span associated with each of the one or more DPUs/FEs by zeroing any differential delays in a path from the one or more COs to one or more copper lines at associated CPEs.

Example 9 can include the subject matter of any one of Examples 1-8, further comprising: performing, via one or more processors, a delay estimation of the one or more copper lines, and a delay estimation between active and a joining line on signals between the one or more copper wires.

Example 10 can include the subject matter of any one of Examples 1-9, further comprising: generating, via one or more processors, a transmission timing adjustment using crosstalk between lines, including the one or more copper lines or one or more optic fibers connecting the one or more DPUs/FEs to the one or more COs; and coordinating upstream and downstream transmit and receive timing to enable crosstalk cancelation and frequency domain equalization.

Example 11 can include the subject matter of any one of Examples 1-10, further comprising: interfacing communications between a CO/cloud processor and associated DPUs/FEs of the one or more DPUs/FEs and a central control/management operation from the CO/cloud processor.

Example 12 can include the subject matter of any one of Examples 1-11, a system for virtualized signal communications with a plurality of digital processing units (DPUs) or fiber extenders (FEs), comprising: an optical analog front end comprising the plurality of digital processing units (DPUs) or fiber extenders (FEs); a copper analog front end coupled to the optical analog front end and one or more customer premise equipments (CPEs) configured to generate cross talk between copper lines; wherein one or more of: the optical analog front end or the copper front end, is/are configured to perform any one of the method acts of claims 1-12 via one or more processors or processing components thereat.

Example 13 is a system for providing network access among a plurality of customer premises equipments (CPEs), the system comprising: a first CPE of the plurality of CPEs comprising one or more first ports coupled to a first set of lines in a vectored group; a second CPE of the plurality of CPEs comprising one or more second ports coupled to a second set of lines in the vectored group; a plurality of distribution point units (DPUs)/Fiber Extenders (FEs) comprising mutual crosstalk with respect to one another as part of the vectored group, wherein the plurality of DPUs/FEs is coupled to a central distribution point (CDP) at a central office (CO) or a cloud network via a fiber link, and the plurality of DPUs/FEs is further coupled to the first CPE via the first set of lines and the second CPE via the second set of lines in the vectored group; wherein the CDP, via one or more processors, is configured to perform a timing synchronization and timing alignment between the plurality of DPUs/FEs to reduce/cancel the mutual crosstalk within the vectored group.

Example 14 can include the subject matter of Example 13, wherein the CDP, via the one or more processors, generates a virtualization of one or more signal processing tasks for the plurality of DPUs/FEs at the CDP location at the CO) or in the network cloud component, wherein the one or more signal processing tasks, besides general operations of signal transmission and reception, comprises at least one of: a near-end crosstalk mutual reduction/cancellation or a far-end mutual crosstalk reduction/cancellation between the plurality of DPUs/FEs and associated CPEs of the plurality of CPEs.

Example 15 can include the subject matter of any one of Examples 13-14, wherein the CDP, via the one or more processors, using virtualization, is further configured to perform the timing synchronization of signals among the vectored group based on a timing reference to align upstream and downstream signals associated with non-colocated DPUs/FEs of the plurality of DPUs/FEs over lines of the vectored group.

Example 16 can include the subject matter of any one of Examples 13-15, further comprising: a plurality of latency adjustment elements (LAEs), in the CDP, the CO, the cloud network or the plurality of DPUs/FEs, configured to equalize a delay between reference points within a delay equalization span, wherein the delay equalization span spans from optical analog front ends configured to join optical paths from the CDP to copper analog front ends configured to respectively join wired pairs to the first and second CPEs.

Example 17 can include the subject matter of any one of Examples 13-16, wherein the plurality of DPUs/FEs comprise DPU transmitters and DPU receivers that are configured respectively to record DPU local time references at which a sample of a timing alignment symbol cross a DPU/FE boundary of a delay equalization span at the plurality of DPUs/FEs, and wherein the CDP comprises a CDP transmitter and a CDP receiver that are configured respectively to record CDP local times at which the sample of the timing alignment symbol crosses a boundary of the delay equalization span.

Example 18 can include the subject matter of any one of Examples 13-17, wherein the CDP is configured to: receive a difference of delays in an upstream and a downstream across a delay equalization span ($\Delta T_{US\text{-}DS}$) between the CDP and the plurality of DPUs/FEs for the plurality of DPUs/FEs; and calculate a downstream delay ($td_{DS}$) for each of the plurality of DPUs/FEs FE for a delay estimation of the fiber link and the plurality of DPUs/FEs based on at least one of: a sum of delays experienced by sample m in upstream and downstream ($t_{RTD}$) and a shift between time references at the CDP and each DPU-k of the plurality of DPUs/FEs.

Example 19 can include the subject matter of any one of Examples 13-18, wherein the CO/network cloud component is configured to: in response to a DPU/FE joining the plurality of DPUs/FEs in the vectored group: receive a report of a difference in delay between an upstream and downstream for the joining DPU/FE; identify a downstream delay associated with the DPU/FE based on the report; synchronize local time references of the plurality of DPUs/FEs with the joining DPU/FE; and provide a mutual transmission timing reference to the plurality of DPUs/FEs and the joining DPU/FE as part of the vectored group.

Example 20 can include the subject matter of any one of Examples 13-19, wherein the CDP is configured to: in response to the joining DPU/FE joining the vectored group and before an active transmission, establish an initial timing reference by creating an internal loopback between a receiver and a transmitter point of the DPU/FE and shifting a local timing reference of the DPU/FE based on a shift calculated from a downstream delay of the DPU/FE.

Example 21 can include the subject matter of any one of Examples 13-20, wherein different DPUs/FEs of the plurality of DPUs/FEs comprise different delay equalization spans of different lengths with respect to the CDP, and the CDP is further configured to utilize a delay equalization span that comprises a longest delay to determine a reference delay equalization span for the vectored group.

Example 22 can include the subject matter of any one of Examples 13-21, wherein the CDP is further configured to initiate an update procedure of a reference delay equalization span for the vectored group ($TD_{DS}$) in response to a joining DPU/FE being added to the vectored group and a downstream delay ($td_{DS}$) of the joining DPU/FE exceeding the reference delay equalization span for the vectored group.

Example 23 can include the subject matter of any one of Examples 13-22, wherein the plurality of DPUs/FEs introduce different delays, respectively, into a binder joining the first set of lines and the second set of lines having the mutual crosstalk therebetween, generate signals entering the binder at a same time based on the different delays.

Example 24 can include the subject matter of any one of Examples 13-23, wherein a DPU/FE of the plurality of DPUs/FEs is configured to: measure a symbol timing of crosstalk from one or more neighboring lines in a binder of the first and second set of lines and update an established DPU timing for a timing alignment or use a current DPU timing for the timing alignment, in response to another line or CPE joining the vectored group.

Example 25 can include the subject matter of any one of Examples 13-24, wherein the another line or the CPE joining the vectored group is configured to measure a delay of a detected time instant relative to an in initial transmission timing reference, and obtain a near-end crosstalk (NEXT) coupling delay and a far-end crosstalk (FEXT) coupling delay based on a shift between transmission instants of upstream and downstream sync signals from the CDP or derived from timing values related to the one or more neighboring lines from the CDP.

Example 26 is a method for a communication system of a customer premise, comprising: virtualizing, via one or more processors, one or more signal processing tasks between a plurality of distribution point units (DPUs)/fiber extender (FEs) and a central distribution point (CDP) of a central office (CO)/network cloud component; and performing, via the one or more processors, a timing synchronization between the plurality of DPUs/FEs and a central point of the CO/network cloud component.

Example 27 can include the subject matter of Example 26, further comprising: performing, via the one or more processors, mutual crosstalk cancelation between the plurality of DPUs/FEs and the central point; wherein virtualizing the one or more signal processing tasks comprises moving a crosstalk cancelation operation, comprising at least one of: a near-end crosstalk (NEXT) or a far-end crosstalk (FEXT), from the plurality of DPUs/FEs to the CDP, and performing the crosstalk cancelation at the CDP.

Example 28 can include the subject matter of any one of Examples 26-27, further comprising: performing, via the one or more processors, the timing synchronization of signals transmitted by the plurality of DPUs/FEs to associated customer premise equipments (CPEs) across a vectored group of lines having a crosstalk therebetween.

Example 29 can include the subject matter of any one of Examples 26-28, further comprising: establishing, via the one or more processors, a timing reference in the plurality of DPUs/FEs that enables an adjustment of a timing of both upstream and downstream signals over lines in a same vectored group associated with the plurality of DPUs/FEs for a delay estimation; and maintaining, via the one or more processors, during a steady state operation of the plurality of DPUs/FEs within the same vectored group a timing therebetween based on the timing reference by performing an update of the timing to improve an accuracy of a timing alignment of the lines in the same vectored group.

Example 30 can include the subject matter of any one of Examples 26-29, further comprising: generating, via one or more processors, a transmission timing adjustment using crosstalk between lines; and coordinating upstream and downstream transmit and receive timing to enable crosstalk cancelation and frequency domain equalization in the lines.

Example 31 is an apparatus of a central distribution point (CDP) of a central office (CO) or a network cloud component for communication with a plurality of digital processing units (DPUs)/fiber extenders (FEs) and customer premise equipments (CPEs), comprising: optical analog front ends coupled to copper analog front ends of the plurality of DPUs/FEs, and to the CPEs via lines of a same vectored group that generate mutual crosstalk therebetween, wherein the plurality of DPUs/FEs are non-colocated with respect to one another; and one or more processors configured to virtualize one or more signal processing tasks from the plurality of DPUs/FEs by moving the one or more signal processing tasks from the plurality of DPUs/FEs and performing the one or more signal processing tasks, and perform a timing synchronization between the plurality of DPUs/FEs to reduce the mutual crosstalk within the same vectored group.

Example 32 can include the subject matter of Example 31, wherein the one or more processors are further configured to: receive DPU local time references at which a sample of a timing alignment symbol cross a DPU/FE boundary of a delay equalization span at the plurality of DPUs/FEs; and record CDP/FE local times at which the sample of the timing alignment symbol crosses a CDP/network cloud boundary of the delay equalization span.

Example 33 can include the subject matter of any one of Examples 31-32, wherein the one or more processors are further configured to: in response to a DPU/FE joining the plurality of DPUs/FEs in the same vectored group: receive a report of a difference in delay between an upstream and downstream for the joining DPU/FE; identify a downstream delay associated with the DPU/FE based on the report; synchronize local time references of the plurality of DPUs/FEs with the joining DPU/FE; and provide a mutual transmission timing reference to the plurality of DPUs/FEs and the joining DPU/FE as part of the vectored group Example 34 can include the subject matter of any one of Examples 31-33, wherein the one or more processors are further configured to: determine a delay estimation for fiber links to the plurality of DPUs/FEs based on a difference of delays in an upstream and a downstream across a delay equalization span ($\Delta T_{US-DS}$) for the plurality of DPUs/FEs and local time references of the plurality of DPUs FEs.

Example 35 can include the subject matter of any one of Examples 31-34, wherein the one or more processors are further configured to: initiate an update procedure of a reference delay equalization span for the vectored group ($TD_{DS}$) in response to a joining DPU/FE being added to the vectored group and a downstream delay ($td_{DS}$) of the joining DPU/FE exceeding the reference delay equalization span for the vectored group.

Examples can include an apparatus comprising means to perform one or more elements of a method described in or related to any of examples (embodiments) above, or any other method or process described herein.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

Examples can include an apparatus comprising logic, modules, or circuitry to perform one or more elements of a method described in or related to any of examples above, or any other method or process described herein.

Examples can include a method, technique, or process as described in or related to any of examples above, or portions or parts thereof.

Examples can include an apparatus comprising: one or more processors and one or more computer readable media comprising instructions that, when executed by the one or more processors, cause the one or more processors to perform the method, techniques, or process as described in or related to any of examples above, or portions thereof.

Examples can include a method of communicating in a wireless network as shown and described herein.

Examples can include a system for providing wireless communication as shown and described herein.

Examples can include a device for providing wireless communication as shown and described herein.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A system for providing network access among a plurality of customer premises equipments (CPEs), the system comprising:
a first CPE of the plurality of CPEs comprising one or more first ports coupled to a first set of lines in a vectored group;
a second CPE of the plurality of CPEs comprising one or more second ports coupled to a second set of lines in the vectored group; and
a plurality of distribution point units (DPUs)/Fiber Extenders (FEs) comprising mutual crosstalk with respect to one another as part of the vectored group, wherein the plurality of DPUs/FEs is coupled to a central distribution point (CDP) at a central office (CO) or a cloud network via a fiber link, and the plurality of DPUs/FEs is further coupled to the first CPE via the first set of lines and the second CPE via the second set of lines in the vectored group;
wherein the CDP, via one or more processors, is configured to perform a timing synchronization and timing alignment between the plurality of DPUs/FEs to reduce/cancel the mutual crosstalk within the vectored group,
wherein the plurality of DPUs/FEs comprise DPU transmitters and DPU receivers that are configured respectively to record DPU local time references at which a sample of a timing alignment symbol cross a DPU/FE boundary of a delay equalization span at the plurality of DPUs/FEs, and wherein the CDP comprises a CDP transmitter and a CDP receiver that are configured respectively to record CDP local times at which the sample of the timing alignment symbol crosses a boundary of the delay equalization span.

2. The system of claim 1, wherein the CDP, via the one or more processors, generates a virtualization of one or more signal processing tasks for the plurality of DPUs/FEs at the CDP location at the CO) or in the network cloud component, wherein the one or more signal processing tasks, besides general operations of signal transmission and reception, comprises at least one of: a near-end crosstalk mutual reduction/cancellation or a far-end mutual crosstalk reduction/cancellation between the plurality of DPUs/FEs and associated CPEs of the plurality of CPEs.

3. The system of claim 1, wherein the CDP, via the one or more processors, using virtualization, is further configured to perform the timing synchronization of signals among the vectored group based on a timing reference to align upstream and downstream signals associated with non-colocated DPUs/FEs of the plurality of DPUs/FEs over lines of the vectored group.

4. The system of claim 1, further comprising:
a plurality of latency adjustment elements (LAEs), in the CDP, the CO, the cloud network or the plurality of DPUs/FEs, configured to equalize a delay between reference points within a delay equalization span, wherein the delay equalization span spans from optical analog front ends configured to join optical paths from the CDP to copper analog front ends configured to respectively join wired pairs to the first and second CPEs.

5. The system of claim 1, wherein the CDP is configured to: receive a difference of delays in an upstream and a downstream across a delay equalization span ($\Delta T_{US\text{-}DS}$) between the CDP and the plurality of DPUs/FEs for the plurality of DPUs/FEs; and
calculate a downstream delay ($td_{DS}$) for each of the plurality of DPUs/FEs FE for a delay estimation of the fiber link and the plurality of DPUs/FEs based on at least one of: a sum of delays experienced by sample m in upstream and downstream ($t_{RTD}$) and a shift between time references at the CDP and each DPU-k of the plurality of DPUs/FEs.

6. The system of claim 1, wherein the CO/network cloud component is configured to:
in response to a DPU/FE joining the plurality of DPUs/FEs in the vectored group:
receive a report of a difference in delay between an upstream and downstream for the joining DPU/FE;
identify a downstream delay associated with the DPU/FE based on the report;
synchronize local time references of the plurality of DPUs/FEs with the joining DPU/FE; and
provide a mutual transmission timing reference to the plurality of DPUs/FEs and the joining DPU/FE as part of the vectored group.

7. The system of claim 6, wherein the CDP is configured to:
in response to the joining DPU/FE joining the vectored group and before an active transmission, establish an initial timing reference by creating an internal loopback between a receiver and a transmitter point of the DPU/FE and shifting a local timing reference of the DPU/FE based on a shift calculated from a downstream delay of the DPU/FE.

8. The system of claim 1, wherein different DPUs/FEs of the plurality of DPUs/FEs comprise different delay equalization spans of different lengths with respect to the CDP, and the CDP is further configured to utilize a delay equalization span that comprises a longest delay to determine a reference delay equalization span for the vectored group.

9. The system of claim 1, wherein the CDP is further configured to initiate an update procedure of a reference delay equalization span for the vectored group ($TD_{DS}$) in response to a joining DPU/FE being added to the vectored group and a downstream delay ($td_{DS}$) of the joining DPU/FE exceeding the reference delay equalization span for the vectored group.

10. The system of claim 1, wherein the plurality of DPUs/FEs introduce different delays, respectively, into a binder joining the first set of lines and the second set of lines having the mutual crosstalk therebetween, generate signals entering the binder at a same time based on the different delays.

11. The system of claim 1, wherein a DPU/FE of the plurality of DPUs/FEs is configured to: measure a symbol timing of crosstalk from one or more neighboring lines in a binder of the first and second set of lines and update an established DPU timing for a timing alignment or use a current DPU timing for the timing alignment, in response to another line or CPE joining the vectored group.

12. The system of claim 11, wherein the another line or the CPE joining the vectored group is configured to measure a delay of a detected time instant relative to an in initial transmission timing reference, and obtain a near-end crosstalk (NEXT) coupling delay and a far-end crosstalk (FEXT) coupling delay based on a shift between transmission instants of upstream and downstream sync signals from the CDP or derived from timing values related to the one or more neighboring lines from the CDP.

13. A method for a communication system of a customer premise, comprising:
- virtualizing, via one or more processors, one or more signal processing tasks between a plurality of distribution point units (DPUs)/fiber extender (FEs) and a central distribution point (CDP) of a central office (CO)/network cloud component;
- performing, via the one or more processors, a timing synchronization between the plurality of DPUs/FEs and a central point of the CO/network cloud component;
- establishing, via the one or more processors, a timing reference in the plurality of DPUs/FEs that enables an adjustment of a timing of both upstream and downstream signals over lines in a same vectored group associated with the plurality of DPUs/FEs for a delay estimation; and
- maintaining, via the one or more processors, during a steady state operation of the plurality of DPUs/FEs within the same vectored group a timing therebetween based on the timing reference by performing an update of the timing to improve an accuracy of a timing alignment of the lines in the same vectored group.

14. The method of claim 13, further comprising:
- performing, via the one or more processors, mutual crosstalk cancelation between the plurality of DPUs/FEs and the central point;
- wherein virtualizing the one or more signal processing tasks comprises moving a crosstalk cancelation operation, comprising at least one of: a near-end crosstalk (NEXT) or a far-end crosstalk (FEXT), from the plurality of DPUs/FEs to the CDP, and performing the crosstalk cancelation at the CDP.

15. The method of claim 13, further comprising:
- performing, via the one or more processors, the timing synchronization of signals transmitted by the plurality of DPUs/FEs to associated customer premise equipments (CPEs) across a vectored group of lines having a crosstalk therebetween.

16. The method of claim 13, further comprising:
- generating, via one or more processors, a transmission timing adjustment using crosstalk between lines; and
- coordinating upstream and downstream transmit and receive timing to enable crosstalk cancelation and frequency domain equalization in the lines.

17. An apparatus of a central distribution point (CDP) of a central office (CO) or a network cloud component for communication with a plurality of digital processing units (DPUs)/fiber extenders (FEs) and customer premise equipments (CPEs), comprising:
- optical analog front ends coupled to copper analog front ends of the plurality of DPUs/FEs, and to the CPEs via lines of a same vectored group that generate mutual crosstalk therebetween, wherein the plurality of DPUs/FEs are non-colocated with respect to one another; and
- one or more processors configured to:
  - virtualize one or more signal processing tasks from the plurality of DPUs/FEs by moving the one or more signal processing tasks from the plurality of DPUs/FEs and performing the one or more signal processing tasks, and perform a timing synchronization between the plurality of DPUs/FEs to reduce the mutual crosstalk within the same vectored group, and
  - determine a delay estimation for fiber links to the plurality of DPUs/FEs based on a difference of delays in an upstream and a downstream across a delay equalization span ($\Delta T_{US\_DS}$) for the plurality of DPUs/FEs and local time references of the plurality of DPUs FEs.

18. The apparatus of claim 17, wherein the one or more processors are further configured to:
- receive DPU local time references at which a sample of a timing alignment symbol cross a DPU/FE boundary of a delay equalization span at the plurality of DPUs/FEs; and
- record CDP/FE local times at which the sample of the timing alignment symbol crosses a CDP/network cloud boundary of the delay equalization span.

19. The apparatus of claim 17, wherein the one or more processors are further configured to:
- in response to a DPU/FE joining the plurality of DPUs/FEs in the same vectored group:
  - receive a report of a difference in delay between an upstream and downstream for the joining DPU/FE;
  - identify a downstream delay associated with the DPU/FE based on the report; synchronize local time references of the plurality of DPUs/FEs with the joining DPU/FE; and
  - provide a mutual transmission timing reference to the plurality of DPUs/FEs and the joining DPU/FE as part of the vectored group.

20. The apparatus of claim 17, wherein the one or more processors are further configured to:
- initiate an update procedure of a reference delay equalization span for the vectored group ($TD_{DS}$) in response to a joining DPU/FE being added to the vectored group and a downstream delay ($td_{DS}$) of the joining DPU/FE exceeding the reference delay equalization span for the vectored group.

* * * * *